Oct. 1, 1968  F. A. WAGNER  3,403,663
VARIABLE VALVE TIMING MECHANISM
Filed Dec. 4, 1967  2 Sheets-Sheet 2
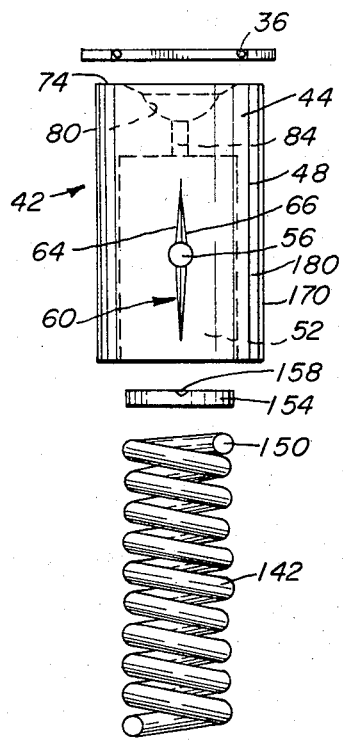
FIG. 4
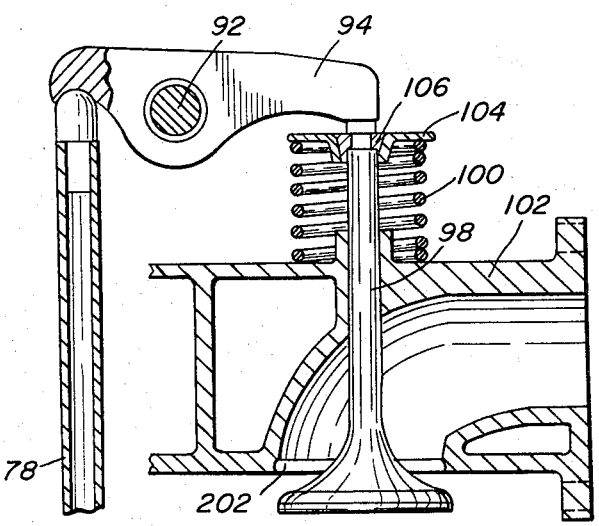
FIG. 5
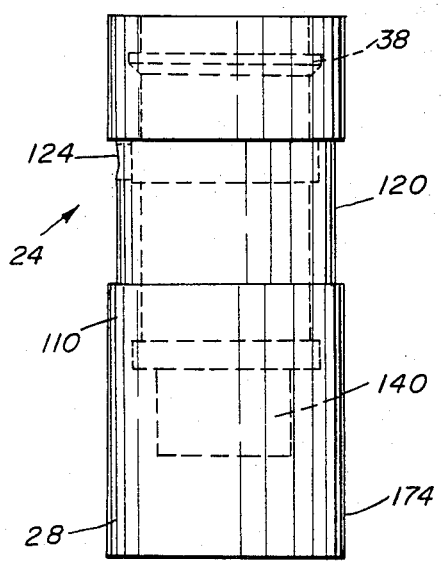
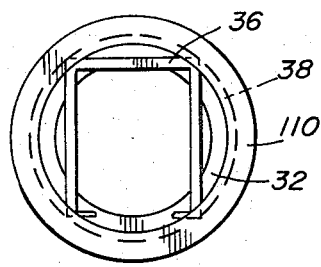
FIG. 6
INVENTOR.
FRANK A. WAGNER
BY Kegan, Kegan & Berkman
ATTYS.

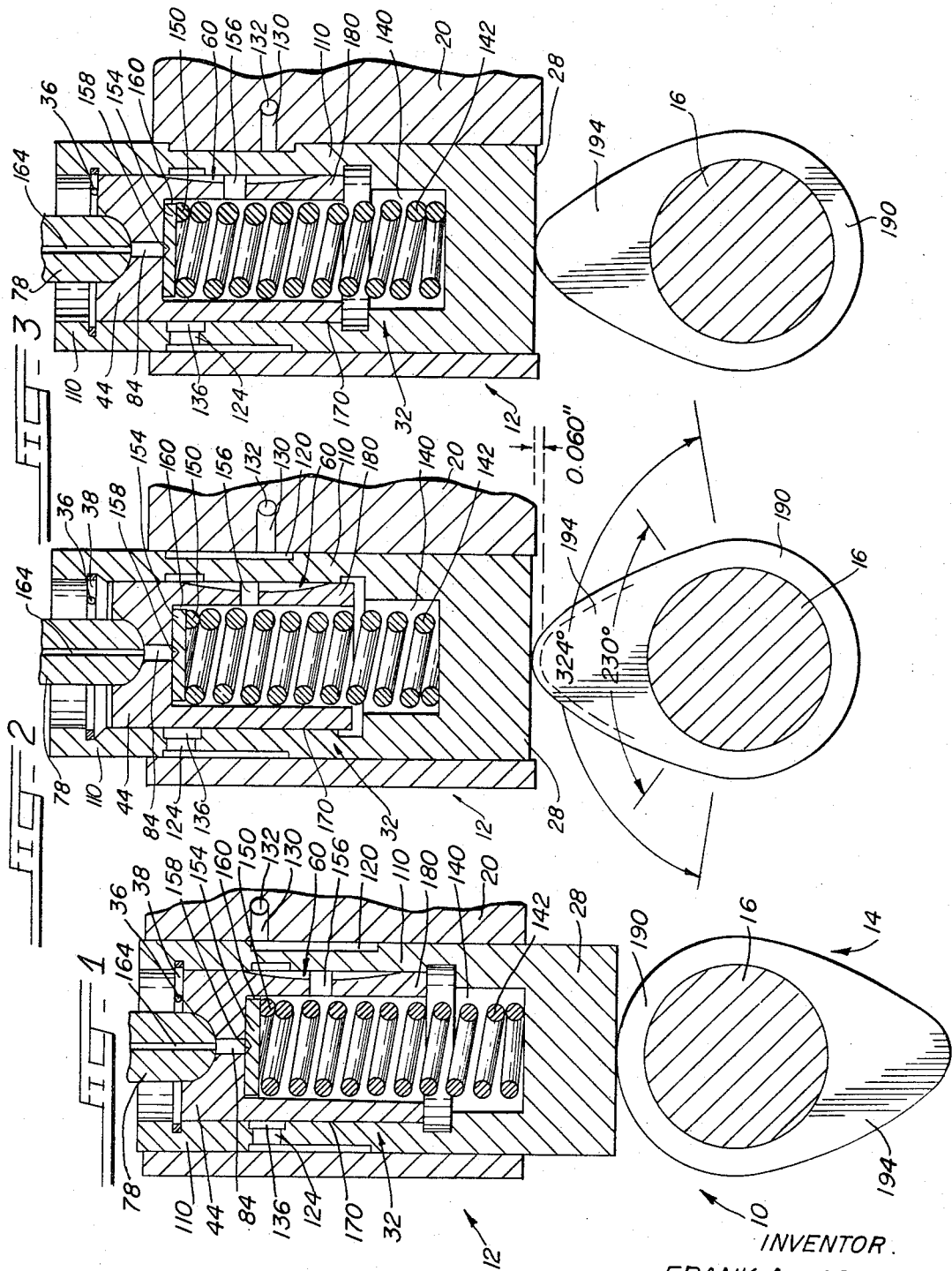

United States Patent Office 3,403,663
Patented Oct. 1, 1968

3,403,663
VARIABLE VALVE TIMING MECHANISM
Frank A. Wagner, 1431 W. Catalpa,
Chicago, Ill. 60640
Continuation-in-part of application Ser. No. 625,890,
Feb. 9, 1967. This application Dec. 4, 1967, Ser.
No. 687,574
23 Claims. (Cl. 123—90)

ABSTRACT OF THE DISCLOSURE

Hydraulic double lifter variable valve timing assembly for regulating the opening and closing of intake and exhaust valves of internal combustion engines, the assembly including a pair of fluid-coupled hydraulic lifters disposed coaxially for relative reciprocal telescoping movement in response to a lobe cam bearing against and controlling movement of one of said lifters, the degree of fluid coupling between the two lifters and, thus, the timing of and extent of lifting by the lifters being a function of engine speed to provide optimum valve operation at any given engine speed.

---

This application is a continuation-in-part of co-pending application Ser. No. 625,890 filed Feb. 9, 1967, now U.S. Patent No. 3,361,122, which is in turn a continuation-in-part of application Ser. No. 544,154, filed Apr. 26, 1966, now abandoned, which is in turn a continuation-in-part of application Ser. No. 478,230, filed Aug. 9, 1965, now U.S. Patent No. 3,277,874; and the present invention relates generally to improvements in variable valve timing mechanisms finding utility in internal combustion engines. More particularly, the invention is directed to engine-speed-controlled hydraulic mechanisms for operating the exhaust and intake valves of such engines.

It is well known to those skilled in the art to which this invention relates that valve timing is very important in achieving maximum engine efficiency, and that valve timing specially suited for high engine speeds is not the best timing for low engine speeds. It is therefore, the aim of the present invention to provide a variable valve timing mechanism of improved and simplified structure which will operate automatically to open and close the valves of an internal combustion engine in a manner to ensure maximum operating efficiency at low speeds, high speeds, and at intermediate speeds.

It is a principal object of the invention to provide an automatically operable engine-speed-controlled, hydraulic variable valve timing mechanism which is operative to vary the valve timing as a function of engine speed and to provide smooth operation and maximum efficiency over the entire operating speed range of the engine.

Another object of the invention is to provide a novel combination of a single lobed cam with a double hydraulic lifter assembly to vary the valve timing automatically as a function of engine speed while providing maximum operating efficiency over the complete operating speed range of the internal combustion engine.

Still another object of the invention is to provide improved hydraulic coupling means for interconnecting two lifters of a valve lifter assembly, in which assembly the degree or extent of coupling is automatically a function of engine speed.

A related object of the invention is to provide a double lifter element valve control mechanism functioning in combination and cooperation with an improved fluid flow gating means responsive to the relative axial positions of valve lifter elements of the hydraulic assembly.

Yet another object of the invention is to provide an improved automatic variable valve timing mechanism in which compression forces applied to a spring of the mechanism are controlled through variable fluid porting means which regulate the fluid coupling between the two lifter elements of the assembly.

Another object of the invention is to provide a hydraulically controlled valve timing mechanism which includes a pair of spring-stressed lifter elements, a fluid chamber, and porting means which automatically cooperate to control oil passage into and from the chamber, to control the degree of fluid coupling of the two lifter elements and to vary this coupling as a function of engine speed, thereby to provide optimum valve timing at any given engine speed.

A related object of the invention is to provide a hydraulically-controlled variable valve timing mechanism for internal combustion engines in which the compression-opposing properties of a compression-resisting spring, in cooperation with fluid coupling and porting means, precludes substantial spring compression at high engine speeds while permitting compression at lower engine speeds.

Yet another object of the invention is to provide an improved variable valve timing mechanism including an outer lifter and an inner lifter and in which the inner lifter is axially reciprocal within the outer lifter but within precisely controlled longitudinal limits, one limit defining a position assumed only at low engine speeds and another limit defining a position assumed at high engine speeds, and in which the positioning is variable infinitely between the two extremes.

It is an important object of the invention to provide in an internal combustion engine a variable valve timing mechanism utilizing but a single cam lobe, but automatically regulated, through cooperating spring forces and fluid ducts and portings, to provide valve opening and timing which is precisely a function of and directly related to engine speeds.

Still another object of the invention is to provide an improved variable valve timing mechanism including a pair of fluid-coupled inner and outer lifters in relatively reciprocal disposition and arranged to obviate mechanical bottoming of the inner on the outer lifter.

A related object of the invention is to eliminate objectional engine noises associated with the physical, mechanical contacting of moving valve lifting elements.

Another object of the invention is to provide a novel metering valve for supplying lubricating fluid to the valve push rod.

Other and further objects, aims and advantages of the invention will become apparent from a reading of the following specification taken in conjunction with the drawings in which:

FIGURE 1 is a semi-schematic illustration of the lifter assembly and cam of one embodiment of the invention with parts broken away and in section and illustrating the mechanism of the lifters and showing the outer lifter in the position assumed at minimum height or lift of the cam lobe;

FIGURE 2 is a view similar to that depicted in FIGURE 1 but showing the internal valve lifter in the maximum height or lift position assumed during slow engine speeds, and including a schematic representation of a sector diagram showing, in reference to different angular positions of the engine crank shaft, the times of opening and closing of an exhaust valve, expressed in degrees pertaining to the valve timing and indicating the effective lifting height and pattern at high and low engine speeds.

FIGURE 3 is a view similar to that illustrated in FIGURE 2 but indicating the position of the inner lifter assumed at high engine speeds and at maximum lift height of the cam lobe;

FIGURE 4 is an exploded view of the component elements of the valve lifter assembly of the valve timing mechanism of one embodiment of the invention;

FIGURE 5 is a schematic representation of the linkage between a push rod actuated through the mechanism of the invention, and a valve assembly; and FIGURE 6 is a top plan view of the valve lifter assembly shown in FIGURE 1.

The present invention represents an improvement over earlier filed copending application Ser. No. 625,890, the instant invention utilizing fewer mechanical parts and producing significantly less noise. The check valve of earlier mechanisms has also been eliminated. In the present invention, the variable valve timing is achieved, as set forth hereinafter, through the use of a single lobed cam in contact with a single lifted element. In accordance with the practice of the present invention the valves and valve-actuating elements coact and cooperate to attain, in a greatly simplified manner, optimum valve cycling over a broad range of engine speeds.

The present invention is not limited in its applicability to any particular internal combustion engine but is generally useful in all such types of engines including overhead valve engines and engines in which the valves are located in the block. The invention also finds utility in engines in which the valve-operating cam shaft is disposed adjacent or over the cylinder head.

For purposes of illustrative disclosure, and not by way of limitation, the operation of the improved variable timing mechanism of the invention will be described herein with reference to an engine having overhead valves, as illustrated schematically in FIGURE 5. The engine itself may be considered conventional and includes a core or block in which the cylinders are provided, pistons which are reciprocally received within the cylinder, and cylinder heads fitted with suitable intake and exhaust valves.

For optimum engine operation and for maximum power and smoothness different valve programming is required under different conditions. At slower engine speeds, or at idling speeds, the intake valve should preferably open as the piston reaches top dead center, and should remain open until the piston reaches bottom dead center. Such operation ensures full intake of air and fuel mixtures. At the same time, exhaust valves should not open until the power stroke is completed and the piston reaches bottom dead center. The exhaust valve should then remain open until the piston returns to top dead center, thus completing the cycle.

At high engine speeds a different valve timing cycle is desirable in order to achieve maximum efficiency and power output. Intake valves must open sooner and close later, since the high velocity of air and fuel rushing into the combustion chamber will cause such air and fuel to continue to enter the chamber even after the piston has passed the bottom dead center. At higher engine speeds the exhaust valve is preferably timed to open considerably before the piston reaches the bottom dead center, or prior to completion of the power stroke, and remains open until the piston has passed the top dead center point. It thus becomes possible to scavange the combustion gases from the combustion chamber. In general, the higher the engine speed, the greater is the fraction of the cycle time during which the valves should be retained open.

However, engines with valves timed for high speed operation will not operate satisfactorily at lower speeds. For example, at low engine speeds the opening of the intake valve at a position before top dead center is reached will cause exhaust gases to be discharged through the intake port. Moreover, as the piston passes bottom dead center, it will push out a portion of the intake mixture, thus reducing the overall effective charge. In a similar manner, the premature opening of the exhaust valve robs the engine of a full power stroke, and the over-extended open period of the valve reduces the intake charge. An additional objectionable feature is that carbonization of the combustion chamber and of the intake valve will occur. Thus, an engine with a predetermined valve timing will give satisfactory performance only within a given limited speed range.

In a typical low speed timing cycle there is relatively small time overlap of the exhaust and intake valves. In contrast, in a timing cycle for high speed engine operation the periods of opening exhaust valves and intake valves are much greater as is the overlap of the open periods of these valves. It is possible through the present invention to obtain the advantages of both low speed and high speed timing, and of intermediate timing, in a single internal combustion engine having a single camming lobe, thus enabling the engine to operate efficiently and at maximum power over a wide range of engine speeds.

The aims and object of the invention are accomplished by providing in an automatic variable valve timing mechanism a single lobed cam in combination with an improved double lifter assembly, the lifters of the assembly being disposed in telescoping relationship and being coupled, variably, through a fluid medium. The extent of coupling or interlocking of the two lifters is a function of fluid porting which is in turn a direct function of engine speed. At relatively high engine speeds no appreciable oil volume is discharged from the fluid cavity between the lifters so that the lifter elements become "locked" together through the incompressible column of oil in the chamber. In this locked position, the inner lifter is displaced upwardly with respect to the base of the outer lifter through the interaction and cooperation of a spring element and fluid porting means whereby, in effect, a greater degree of lifting is realized at the higher engine speeds. At low engine speeds there is adequate time during the camming cycle for fluid to escape from within the chamber between the two lifter elements so that the inner lifter approaches closer to the base of the outer lifter to provide, in effect, a "shorter" lifter element. At intermediate speeds, the actual lifting will be a composite or hybrid of the two above-described modes of operation. Thus, for any particular engine speed, optimum conditions of efficiency and power are realized.

Referring more particularly to the drawings, there is shown in FIGURES 1, 2 and 3, for the purpose of illustrative disclosure, a preferred embodiment of the variable valve timing mechanism of the invention, incorporating the teachings thereof. The timing mechanism 10 includes a double lifter assembly 12 and a cam 14, the latter being fixed on a cam shaft 16 for rotation therewith.

The double lifter assembly 12, shown in detail in FIGURES 1 through 3 and depicted in the exploded view, FIGURE 4, is slidably disposed for reciprocating action in a fixed body or block 20. The lifter assembly 12 itself includes a generally cylindrically shaped outer lifter 24 having a base wall or floor 28 which is normally supported on and rides on the cam 14. An inner lifter 32 is coaxial with and slidably supported within the outer lifter 24. A spring clip 36 (FIGURE 6) carried in an internal annular groove or recess 38 near the upper end of the outer lifter precludes inadvertent separation of the two principal elements of the lifter assembly.

Referring more particularly to the inner lifter 32, in the preferred embodiment of the invention illustrated, the inner lifter comprises, as seen most clearly in FIGURE 4, a cup-shaped body 42 of generally cylindrical external form and including a top wall 44 and a depending annular side wall 48 defining a downwardly opening chamber or cavity 52. The side wall 48 of the inner lifter is formed with a through port or orifice 56, and the wall 48 itself is undercut to provide a groove or duct 60 which intersects the port 56 and extends generally along a portion of the vertical expanse of the inner lifter 32 between the upper and lower limits thereof. The duct 60 has a variable or inconstant cross sectional area as defined by horizontal sections taken at vertically spaced positions along the length of the duct 60, the cross sectional area increasing from an upper extremity 62 of the duct 60 downwardly. While the duct 60 may take various configurations or physical forms, in the particular exemplary structure depicted in FIGURE 4, the duct 60 is a trough-like declivity formed to extend longitudinally along and radially inwardly of the wall 48 of the inner lifter 32, with trough depth at a maximum value at the location of the communicating through port 56. The walls 64 and 66 of the duct, as shown, constitute curved surfaces with a radius of curvature of about 2½ inches, and maximum depth of the duct is, in the particular embodiment of the invention illustrated, about 0.030 inch. The parameters are not critical and, in the light of the present teachings, those skilled in the art will be able to apply the present invention to all types of valving systems, without exercising inventive faculties.

The top wall or head portion 44 of the inner lifter 32 is formed with a socket 70 extending axially inwardly of the top surface 74 of the lifter 32 for receiving in supporting engagement a push rod 78. Lubrication at the rounded base 80 of the push rod 78 is provided through a passage 84 in the head 44 of the inner lifter and communicating with the chamber 52. As indicated schematically in FIGURE 5, the push rod 78 is connected through conventional linkage, as for example, a rocker pin 92 and a rocker cam 94 assembly, to stress against a valve stem 98. During operation of the engine the push rod acts, in the conventional manner, to overcome the pressure of the valve return spring 100 which is retained between a fixed wall 102 and a spring seat 104 keyed 106 on the valve stem 98, to open the valve.

The outer lifter 24 is reciprocably slidable in the block 20 of the engine and is generally cylindrical or tubular in form with an integral base 28 which, as previously described, rides upon the cam 14. Intermediate its opposed ends the cylindrical shell or wall 110 of the outer lifter 24 is cut away to provide an annular groove 120 extending radially inwardly from the periphery of the wall 110 as seen most clearly in FIGURE 4. The annular grooved portion 120 of the lifter shell or wall 110 is provided with an opening or port or ports 124 extending through the wall of the outer lifter, the ports 124 communicating with an oil supply and return channel 130 and an oil line 132 in the block 20. The other end of the port 124 communicates with an annular passage 136 formed between the body 52 of the inner lifter and the wall 110 of the outer lifter.

The inner lifter 32 is reciprocably slidable axially within the outer lifter 24, abutting contiguous wall surfaces of the lifters being dimensioned for telescoping action. Coaxial with the axially reciprocably shiftable telescopingly coupled inner and outer lifters 32 and 24 in the elongated chamber 140 and extending therewithin is a coil spring 142 supported at its lower end of the base 28 of the outer lifter 24 and resiliently urging the inner lifter 32 upwardly through forces applied to the underside 144 of the top wall 44 thereof. Interposed between the upper end 150 of the spring 142 and the underside 144 of the top wall 44 of the inner lifter 32 is a disc-like oil metering plate 154 having formed in its top face to extend between a center region and a peripheral limit of the plate an open-ended groove-like slot 158 communicating with an annular channel 160 defined between a peripheral annular wall of the plate 154 and a radially outwardly spaced facing wall portion of the inner lifter 32, whereby the assembly establishes a volume-limiting fluid flow path between the oil chamber 140 and, through the head passage 84, a central bore 164 in the push rod 78.

As described above and as illustrated in FIGURES 1 through 3, the principal outer wall surface 170 of the inner lifter 32 is in sliding but fluid-sealing engagement with the inner surface 174 of the wall 110 of the outer lifter. However, in the region of the duct 60 there is an automatically variable zone of controlled fluid passage constituting fluid venting and input means, the critical passage 60 between the walls 170 and 174 establishing controlled fluid zone from the fluid inlet port 124 in the wall 110 of the outer lifter 24 and the through port 56 in the wall 180 of the inner lifter 32 to the central chamber or oil reservoir 140. The fluid conduits or passage 130 in the block 20, the communicating annular channel 136, the bore 124 through the wall 110 of the outer lifter 24 and the passage 56 through the wall 180 of the inner lifter 32 each presents a fixed and invariable cross section to the flow of fluid between the oil line 132 and the chamber or fluid reservoir 140. In contrast, the cross sectional area presented by the duct 60 depends upon and is a direct function of the relative axial positions occupied by the inner and outer lifters. Since the cross sectional area of the duct or groove 60 is a maximum in the region of its intersection with the port 56 and decreases progressively as the duct 60 projects upwardly, maximum rate of fluid flow through the duct will take place when, during reciprocating movement of the inner lifter 32 within the outer lifter 24, the port 56 most closely approaches an axial position at or on a horizontal line with the communicating channel 136. In the embodiment of the invention illustrated, this condition obtains when the inner lifter 32 is at an upward extreme of travel with respect to the outer lifter 24 (FIGURE 3). With downward movement of the inner lifter 32 within the outer lifter 24 the cross section of the duct 60, at its position opposing the channel 136, decreases and fluid escape from or discharge from the cavity 140 is restricted, becoming a minimum when the inner lifter reaches a downward limit of its travel (FIGURE 2). The restricted flow serves to damp the downward motion and obviates shocks.

The operation of the variable valve timing mechanism is further described below with reference to FIGURES 1, 2 and 3. Referring first to FIGURE 1 which depicts the valve lifter 24 engaging the cam 14 at the heel portion 190, and considering first the case of low engine speed operation, with the parts positioned as illustrated in FIGURE 1, the pressure of the valve spring 100 transmitted to the inner lifter 32 is at a minimum and the opposing pressure of the internal spring 142 is adequate to bias the inner lifter 32 to its upwardly extreme position against the stop or spring clip 36. In this position the duct 60 between the lifter walls provides a maximum cross section and the most free or unrestricted fluid communication or fluid passage between the internal cavity 140 within the lifters and the passage 130 in the block.

As the cam shaft 16 rotates, the cam lobe 14 revolves, and as the high portion 194 engages the outer lifter 24, the lifter is forced upwardly. Concurrently, compressive force is applied to the spring 142 tending to move the inner lifter downwardly relative to the outer lifter as the outer lifter rises. Upon consideration of the structure described, it is readily apparent that in order for the inner lifter to move downwardly within the outer lifter from the position shown in FIGURE 1 to the position shown in FIGURE 2, fluid must be dispelled or released from the annular cavity or chamber 140. While some fluid may be dispelled through the slot 158 in the oil metering plate 154 to the push rod 78, such discharge is exceedingly limited and inadequate to permit appreciable downward shifting of the inner lifter. The major volume of fluid to be discharged from the chamber 140 must escape through the port 56 and the communicating duct 60 and then through the channel 136 and the bore 24 to the passage 130.

Since the inter-wall clearance afforded by the duct or groove 60 is limited, the duct constitutes a fluid control port, and a finite pre-determined time is required to permit sufficient fluid to escape through this port so that the internal lifter 32 may move toward the base wall 28 of the outer lifter, to the position shown in FIGURE 2. The effective cross section of the duct 60 decreases as the inner lifter moves downwardly, and the parameters of the mechanical system described are such that at low engine speeds there is adequate fluid escape time to permit the downward displacement of the inner lifter 32.

However, at high engine speeds (FIGURE 3) there is insufficient time, and thus the upward lifting or displacement of the push rod 98 at the high lobe portion of the camming cycle is less at low engine speeds than is the displacement at a corresponding portion of the cycle but at higher engine speeds.

That is, at high engine speeds and with the outer lifter riding on the heel portion 190 of the cam 14, the relative positioning of the internal or inner lifter 32 is the same as at low engine speeds and as illustrated schematically in FIGURE 1. However, at such engine speeds, as the cam rotates and the high lift portion 194 of the cam engages and pushes upwardly on the outer lifter, there is insufficient time to permit the discharge of appreciable fluid from the chamber 140 through the passage or duct 60. As a result, the inner lifter 32 remains in its upwardly displaced position and in substantial abutment against the spring clip 36 throughout the camming cycle. The significant practical effect at such high engine speeds is to lift the internal lifter 32 and its abutting push rod 98 earlier in the cycle and to a higher upper limit and to hold the valve 202 in an open position for a greater fraction of the camming cycle. At high engine speeds and associated high annular rotation of the cam shaft 16, the intake and exhaust valves of the engine will open "sooner" and close "later" than at low engine speeds, the fluid medium in the annular cavity 140 constituting a positive coupling or interlock between the inner and outer lifters at high engine speeds.

For purposes of illustrative disclosure, and not by way of limitation, for the preferred cam contour illustrated, note FIGURE 2 which depicts the times of opening and closing of valves both for slow speed and for high speed engine operation. Recognizing that the cam shaft travels one r.p.m. for every two revolutions of the crank shaft, it is clear that, in the preferred arrangement illustrated, for low engine speed operation the intake and exhaust valves will open and close for about equal time periods. At idling speeds the valve open time would be about 230°. At high engine speeds the valves will open sooner and close later, and in the preferred cam lobe illusrated, the valves will open 0.040 "to 0.060" sooner, so that for engine speeds of about 1800 r.p.m. the valve open time is about 324°. The schematic diagram of FIGURE 2 represents intake valve operation; exhaust valve operation would be similar, but opposite in phase. In the high lift portion of the cam illustrated schematically in FIGURE 2, the outer line represents the actual physical limit of the mechanical cam, and comprises the effective cam contour at high engine speed. The dotted or phantom line symbolizes the effective cam contour at low engine speeds, that is, when there is sufficient time to permit fluid escape and to allow the inner lifter to move toward the base wall of the outer lifter. In the preferred system and cam described, the difference in the maximum lift is, as indicated in FIGURE 2, 0.060 inch. At intermediate engine speeds the "effective" cam lobe contour will fall in between the two limits illustrated in FIGURE 2. Under such conditions, the intake and exhaust valve timing cycle is a composite of the two extremes. Thus, in accordance with the practice of the present invention, it is possible to obtain, in a single engine and with a single cam lobe, the advantages of low speed and of high speed timing and of intermediate timing ensuring efficient engine operation at maximum speeds, at low speeds, and at intermediate speed ranges.

While one preferred commercial embodiment of the novel variable valve timing mechanism of the invention has been illustrated and described, it is understood that the same is capable of modification and that such modifications may be made without departure from the spirit and scope of the invention. For example, whereas in the particular embodiment of the invention illustrated the walls which define the duct take the form of a pair of curved surfaces intersecting along a radially inwardly displaced, curved, longitudinally extending line, many other arrangements will, in the light of the present teachings and disclosure, be obvious to those skilled in the art. Simple equivalents include flat walls as well as a single curved wall. It is also contemplated that the duct or groove may be formed in the wall of the outer rather than the inner lifter, and that the fluid flow control duct may be formed partially in the inner and partially in the outer lifter.

While disclosures of preferred embodiments of the method and of the apparatus of the invention have been provided, it will be apparent that numerous modifications and variations thereof may be made without departing from underlying principles of the invention. It is therefore, described by the following claims to include within the scope of the invention all such variations and modifications by which substantially the results of this invention may be obtained through the use of substantially the same or equivalent means.

What is claimed is:

1. In an engine-speed-controlled cam-actuated automatically variable mechanism for opening valves of an internal combustion engine and including:
   a cam having a cam surface,
   a fixed body having a fluid supply passage,
   a pair of fluid-coupled lifters arranged within said body in coaxial sliding engagement and having wall portions disposed for relative telescopic axial movement,
   said lifters comprising an outer lifter abutting and following said cam surface and an inner lifter in an out-of-contact relation with said cam surface and engaging a push rod for opening a valve of an engine,
   said lifters defining therebetween a chamber adapted to contain a body of fluid comprising fluid means coupling one of said lifters to the other,
   a wall of said outer lifter having through fluid inlet means communicating with said fluid supply passage in said fixed body,
   passage means connecting said fluid inlet means to said chamber for introduction of fluid thereto;
   the improvement wherein said passage means comprises an orifice extending transversely through a wall of said inner lifter and communicating with said chamber,
   said orifice intersecting a fluid-flow-limiting duct of variable cross sectional area formed between and extending longitudinally along opposed facing surfaces of said wall portions of said lifters and communicating with said through fluid inlet means in said wall of said outer lifter,
   said duct being disposed to extend generally in a direction of telescopic axial movement of said lifters and an effective cross sectional area of said duct being correlated with relative axial positions assumed by by said inner and said outer lifters during axial displatement of said lifters relative to one another;
   whereby said orifice and said duct constitute, in combination,
   porting means for controlling the rate of discharge of fluid from said chamber during axial displacement of said lifters relative to one another and for controlling the degree to which axial reciprocal movement of said inner lifter coincides with and duplicates axial reciprocal movement of said outer lifter on said cam,
   the degree of fluid coupling of said lifters being thereby a function of linear displacement velocity of said outer lifter in response to cam action thereagainst, and
   spring means urging one end of said inner lifter against said push rod and biasing an opposite end of said inner lifter to an out-of contact position with respect to a base wall of said outer lifter.

2. The structure as set forth in claim 1 wherein said duct comprises a trough-like longitudinally disposed declivity formed to extend radially inwardly of a bounding wall surface of one of said lifters and bridged by an opposing facing wall of the other of said lifters.

3. The structure as set forth in claim 1 wherein said duct defines a zone which is of inconstant cross-sectional area as measured transversely of said duct at spaced positions along its length.

4. The structure as set forth in claim 2 wherein said cross-sectional area increases along a path extending from an upper extremity of said duct downwardly toward said orifice therebelow.

5. The structure as set forth in claim 1 wherein a horizontal cross-section of said duct is substantially triangular in peripheral contour.

6. The structure as set forth in claim 1 wherein a cross section of said duct defines a peripheral contour consisting of three lines each connected at its ends to two other lines to form an endless path, two of said lines being concave and one being convex, as viewed from a position within said path.

7. The structure as set forth in claim 1 wherein said duct is bounded on two sides by a pair of surfaces intersecting along a generally vertically extending radially inwardly arcing line to define a substantially V-shaped groove in a wall of said lifters.

8. The structure as set forth in claim 1 wherein said duct comprises a fluid conduit defined by a wall of one of said lifters and a trough-like declivity formed in a facing wall of the other of said lifters at said wall portions thereof disposed for relative telescopic axial movement.

9. The structure as set forth in claim 1 and further comprising metering valve means for control of flow of lubricating fluid from said chamber to a base of said push rod engaged by said inner lifter.

10. The structure as set forth in claim 9 wherein said metering valve means comprises a disc-like plate horizontally disposed to abut an upper end wall of a cavity extending axially inwardly and upwardly of said inner lifter from a base portion thereof,
said plate defining between an encircling peripheral wall thereof and an inner vertically extending cylindrical wall of said inner lifter channel means in fluid flow communication with said chamber,
said plate having formed therein to extend between a center region of a top surface of said plate and a peripheral limit thereof an open-ended grooved communicating with said channel means,
said upper-end wall of said inner lifter having formed to extend vertically therethrough a port constituting a fluid flow path between a base of said push rod and said groove for delivery of lubricating fluid from said chamber to said push rod and for flow-regulated discharge of fluid from said chamber.

11. The structure as set forth in claim 1 wherein said spring-means is confined in said chamber to extend axially between said base wall of said outer lifter and an upper end wall of said inner lifter.

12. The mechanism as set forth in claim 1 wherein said chamber between said outer and inner lifters includes a well-like cavity in the base of said outer lifter, and wherein said inner lifter has an open-ended hollow core coaxial with and opening into and communicating with said cavity, said hollow core together with said cavity constituting an oil reservoir of variable volume.

13. The structure as set forth in claim 1 wherein each said inner and said outer lifters comprises a generally cylindrical container open at one end, said lifters being disposed telescopingly to inter-engage in facing open-end relationship to define a chamber extending coaxially within said lifters and bounded by telescopingly engaging walls of said lifters and by opposed end-walls thereof.

14. The structure as set forth in claim 12 wherein said spring means is disposed axially within said chamber and comprises a coil spring stressingly and resiliently abutting at opposed axial extremities thereof corresponding said opposed end walls of said lifters to bias said end walls axially outwardly of one another.

15. The structure as set forth in claim 1 wherein fluid contained in said chamber between said lifters comprises means precluding downward movement of said inner lifter within said outer lifter in the absence of fluid escape from said chamber, a rate of said downward movement being regulated by a rate at which said fluid is dispelled from said chamber through said porting means.

16. The structure as set forth in claim 1 wherein said spring means is strongly resistent to and opposes axial compression and comprises an opposing structural element to be overcome during relative downward movement of said inner lifter within said outer lifter as said outer lifter engages a high-lift portion of said cam, and wherein
said porting means comprises fluid-flow-limiting means regulating fluid discharge from said chamber and precluding rapid relative downward movement from said inner lifter within said outer lifter and toward a base wall thereof as said outer lifter engages said high lift portion of said cam,
said spring means being effective rapidly to force said inner lifter toward an upper limit position when said lower lifter engages a low-lift portion of said cam;
whereby said mechanism automatically provides smaller cycle fractions of valve openings at lower engine speed and larger cycle fractions of valve openings at higher engine speed, thereby effecting earlier opening and later closing of intake and exhaust valves at higher engine speed and later openings and earlier closing of said valves at lower engine speed.

17. The structure as set forth in claim 1 and further comprising a retainer ring carried by and projecting radially inwardly of a vertical wall of said outer lifter at an upper portion thereof, said ring constituting mechanical stop means limiting upward travel of said inner lifter within said outer lifter in response to spring pressure urging said inner lifter upwardly of a base of said outer lifter.

18. The mechanism as set forth in claim 1 wherein said porting means regulating volume rate of fluid discharged from said chamber during cam action against said outer lifter limits volume rate of fluid exhaust from said chamber, volume of fluid exhaust from said chamber as a function of time varying inversely as the angular velocity of said cam shaft and a lobe of said cam during operation of said engine;
whereby at slow engine speed, input to and exhaust of fluid from said chamber permits reciprocal movement of said inner lifter within said outer lifter, while at high engine speed, time lag and restricted fluid discharge from said chamber through said porting means preclude independent movement of said outer and inner lifters and establish a degree of fluid coupling, engagement and inter-locking between said lifters,
said degree of coupling, engagement and inter-locking being proportional to and increasing with engine speed.

19. The mechanism as set forth in claim 1 wherein said duct comprises an aperture between walls of said inner and said outer lifters and defines a fluid passage zone of a variable cross-sectional area, said area being correlated with relative axial positions assumed by said inner and said outer lifters during said axial displacement of said lifters relative to one another.

20. The mechanism as set forth in claim 1 wherein said chamber between said inner and outer lifter comprises a fluid reservoir of variable volume and wherein said inner and said outer lifters are formed with communicating open-ended coaxially entending hollow cores.

21. In an engine-speed-controlled cam-actuated automatically variable mechanism for opening valves of an internal combustion engine and including:
a cam having a cam surface,
a fixed body having a fluid supply passage,
a pair of fluid-coupled lifters arranged within said body in coaxial sliding engagement and having wall portions disposed for relative telescopic axial movement,
said lifters comprising an outer lifter abutting and following said cam surface and an inner lifter in an out-of-contact relationship with said cam surface and engaging a push rod for opening a valve of an engine,
said lifters defining therebetween a chamber adapted to contain a body of fluid comprising fluid means coupling one of said lifters to the other,
a wall of said outer lifter having through fluid inlet means communicating with said fluid supply passage in said fixed body;
the improvement therein one of said inner and said outer lifters is formed to provide along a vertically extending wall surface thereof a cut away portion establishing an elongated slot of variable cross-sectional area defining a fluid flow gating zone between said lifters at contiguous surfaces thereof and longitudinally therealong,
said slot intersecting a through bore formed in a vertical wall of said inner lifter and communicating with said fluid inlet means formed in said wall of said outer lifter,
flow rate of fluid through said gating zone being correlated with relative axial positions assumed by said inner and said outer lifters during axial displacement of said lifters relative to one another;
whereby said slot constitutes in combination with said bore fluid flow control passage means between said fluid inlet means and said chamber.

22. The structure as set forth in claim 2 wherein maximum depth of said duct as measured radially inwardly of a bounding wall surface of said one of said lifters is about 0.030 inch.

23. The structure as set forth in claim 6 wherein said surfaces are curved surfaces formed on a radius of about 2½ inches.

References Cited
UNITED STATES PATENTS

| | | | |
|---|---|---|---|
| 1,353,993 | 9/1920 | Fisher | 123—90 |
| 2,484,109 | 10/1949 | Meinecke | 123—90 |
| 2,614,547 | 10/1952 | Meinecke | 123—90 |
| 2,791,993 | 5/1957 | Hubbard et al. | 123—90 |
| 2,931,347 | 4/1960 | Williams | 123—90 |
| 3,058,454 | 10/1962 | Goncalves | 123—90 |
| 3,142,290 | 7/1964 | Lesher | 123—90 |
| 3,277,874 | 10/1966 | Wagner | 123—90 |
| 3,361,122 | 1/1968 | Wagner | 123—90 |

AL LAWRENCE SMITH, *Primary Examiner.*